United States Patent
Arai et al.

[11] Patent Number: 6,066,207
[45] Date of Patent: May 23, 2000

[54] POWDER COATING BOOTH

[75] Inventors: Hiroshi Arai; Yukihide Yamashita; Masayuki Yamaguchi; Kenichirou Mori, all of Saitama-ken, Japan

[73] Assignee: Honda Giken Kogyo Kabushiki Kaisha, Tokyo, Japan

[21] Appl. No.: 09/080,531

[22] Filed: May 18, 1998

[30] Foreign Application Priority Data

May 20, 1997 [JP] Japan ..................................... 9-129880

[51] Int. Cl.[7] ................................................. B05C 15/00
[52] U.S. Cl. ........................... 118/326; 118/308; 118/312; 118/DIG. 7; 427/425
[58] Field of Search .................................... 118/326, 308, 118/312, DIG. 7; 55/DIG. 46; 454/50, 49; 427/425

[56] References Cited

U.S. PATENT DOCUMENTS

| | | | |
|---|---|---|---|
| 3,965,805 | 6/1976 | Muehlbauer | 118/326 |
| 4,044,175 | 8/1977 | Coxon et al. | 118/326 |
| 4,968,530 | 11/1990 | Yamane et al. | 427/425 |

FOREIGN PATENT DOCUMENTS

| | | |
|---|---|---|
| 0 507 971 A1 | 4/1991 | European Pat. Off. . |
| 8-299888 | 11/1996 | Japan . |
| WO91/16141A1 | 10/1991 | WIPO . |

*Primary Examiner*—Laura Edwards
*Attorney, Agent, or Firm*—Armstrong, Westerman, Hattori, McLeland & Naughton

[57] ABSTRACT

A powder coating booth for performing therein powder coating onto an article to be coated is divided into an automatic coating zone in which coating is performed only by automatic coating machines and manual coating zones in which coating is performed by a worker. A dry type of first recovering apparatus which recovers only that powder coating material in the automatic coating zone which has not been coated onto the article to be coated is provided separately from a second recovering apparatus which recovers that powder coating material in the manual coating zones which has not been coated onto the article to be coated. In this manner, the ratio of reuse of the recovered uncoated powder coating material is improved.

2 Claims, 2 Drawing Sheets

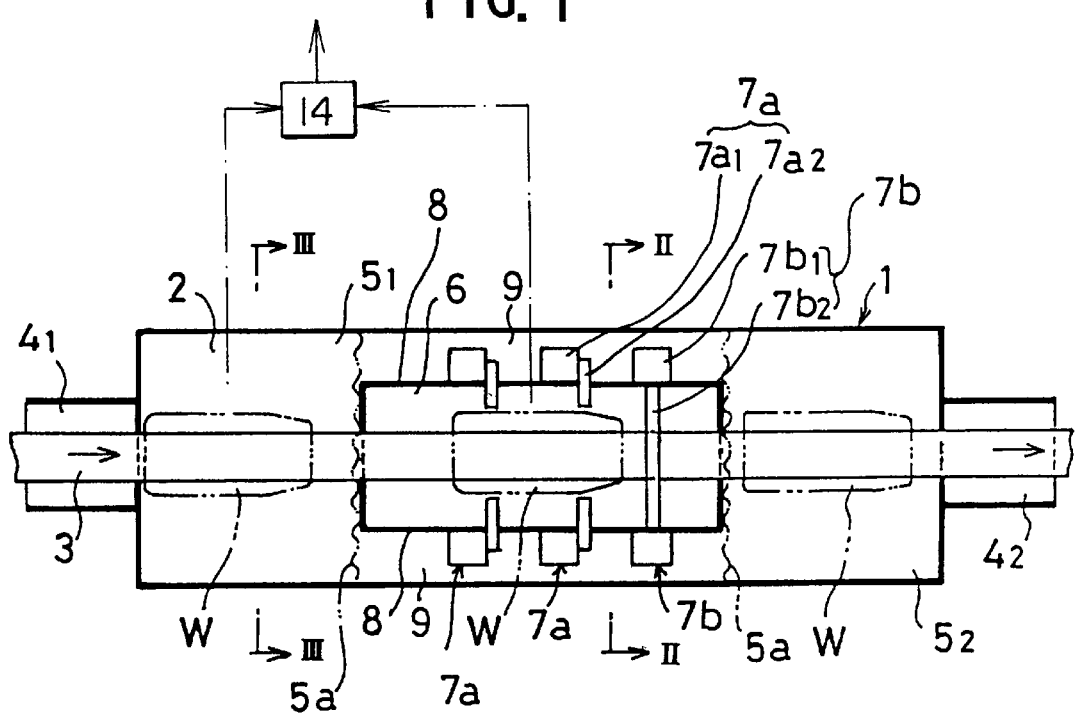

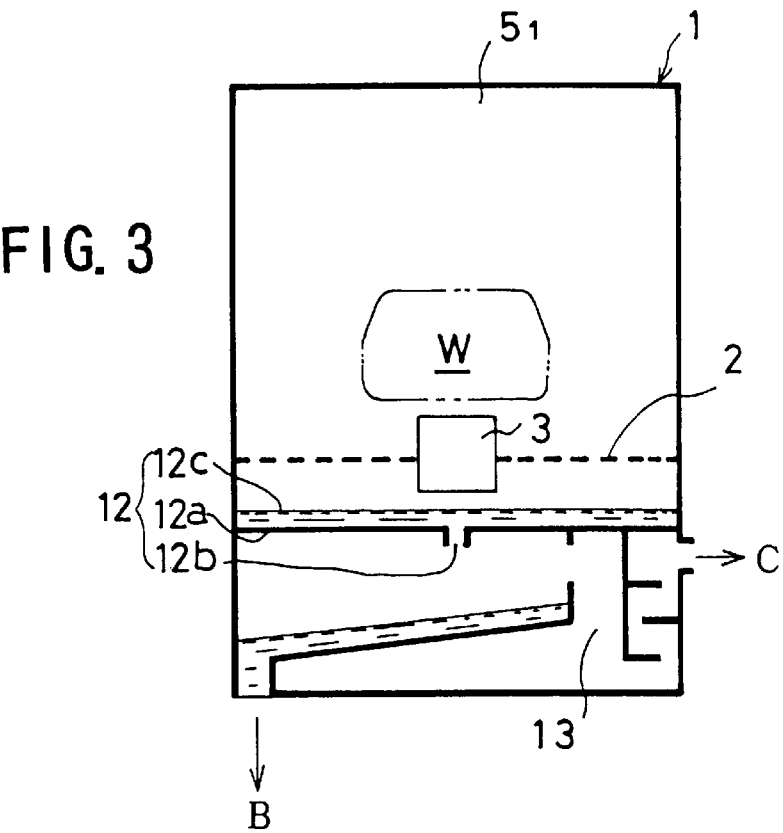
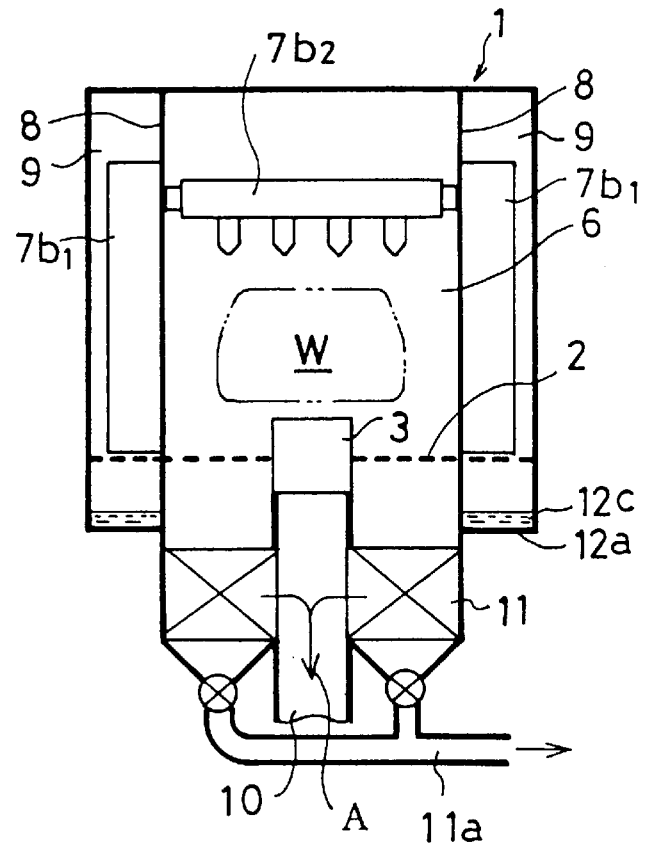

POWDER COATING BOOTH

BACKGROUND OF THE INVENTION

1. Field of the Invention

The present invention relates to a powder coating booth in which powder coating of an article is performed.

2. Description of the Related Art

As a powder coating booth, there has hitherto been known the following in Japanese Published Unexamined Patent Application No. 299888/1996. Namely, an article to be coated which is transported into a powder coating booth is sprayed with a powder coating (or painting) material by means of coating guns of an automatic coating machine. The powder coating material which has not been coated on, or adhered to, the article to be coated is recovered by a dry type of recovering apparatus which recovers the powder coating material. In case the article to be coated is of a complicated shape such as a vehicle body of a motor car, there will be some portions which are left uncoated if the coating is made only by spraying the powder coating material by means of the automatic coating machine. Therefore, after having coated the article to be coated by spraying with the automatic coating machine, a worker sprays the required portions with the powder coating material by means of a coating gun, to thereby perform the required and sufficient powder coating.

However, if the coating work is performed by the worker, foreign matter such as dust, or the like, is brought into the powder coating booth by the worker. Therefore, there is a problem in that the foreign matter is likely to get mixed into the powder coating material that has been recovered by the recovering apparatus. Since it is extremely difficult to completely separate the foreign matter in the powder coating material, it is thus extremely difficult to reuse the powder coating material into which the foreign matter has been mixed. This fact brings about much waste in the powder coating material, with the result that the coating cost becomes high. Further, in a case where much foreign matter has been brought into the powder coating booth, the coating work must be stopped and the entire powder coating booth must be cleaned before the powder coating material that is available for reuse is made ready for recovering. This results in a poor productivity.

In view of the above-described problems, the present invention has an object of providing a powder coating booth in which the recovered powder coating material can be reused at a higher ratio of such reuse.

SUMMARY OF THE INVENTION

In order to attain the above and other objects, the present invention is a powder coating booth for performing therein powder coating onto an article to be coated, wherein the powder coating booth is divided into an automatic coating zone in which coating is performed only by an automatic coating machine and a manual coating zone in which coating is performed by a worker, the powder coating booth comprising: a dry type of first recovering apparatus which recovers only that powder coating material in the automatic coating zone which has not been coated onto the article to be coated; and a second recovering apparatus which recovers that powder coating material in the manual coating zone which has not been coated onto the article to be coated, the first recovering apparatus being provided separate from the second recovering apparatus.

According to this arrangement, the foreign matter such as dust, or the like, that has been brought by the worker into the powder coating booth is recovered by the second recovering apparatus which recovers that powder coating material in the manual coating zone which has not been coated. In this manner, foreign matter is prevented from mixing with that uncoated powder coating material in the automatic coating zone which is recovered by the first recovering apparatus. Therefore, the powder coating material that has been recovered by the first recovering apparatus can be readily reused, with the result that the ratio of such reuse is improved. Further, since the first recovering apparatus is arranged to be of a dry type, there is no need, unlike the wet type, of drying the recovered powder coating material. Therefore, there is no problem of insufficient drying, or the like, with the result that the ratio of such reuse is improved.

If the powder coating booth is partitioned, it becomes possible to recover the uncoated powder coating material in each of the zones by a separate recovering apparatus. If the second recovering apparatus is arranged to be of a wet type, the dropping or precipitation of the foreign matter, or the like, in the manual coating zone is accelerated. As a result, the lowering of the coating quality due to the adhesion of the suspended matter is prevented. Further, it is not necessary to provide a wet type of air sealing zone which is used to prevent the leaking of the powder coating material from the powder coating booth. This wet type of the second recovering apparatus is thus more advantageous than the dry type. In addition, the wet type of recovering apparatus is simpler in construction than the dry type and is lower in cost. It is therefore advantageous with respect to maintenance and cost.

Still furthermore, if the recovering apparatus which recovers the powder coating material is arranged to be of a wet type, the ratio of reuse of the powder coating material may become lower. However, that uncoated powder coating material in the manual coating zone which is recovered by the second recovering apparatus has a lower possibility of being reused due to the mixing therewith of the foreign matter that has been brought in by the worker. In view of the above-described fact, it is advantageous to select a recovering apparatus which recovers the powder coating material on condition, or in anticipation of the case, that the powder coating material cannot be reused.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 1 is a plan view showing the inside of a powder coating booth according to an embodiment of the present invention;

FIG. 2 is a sectional view taken along the line II—II in FIG. 1; and

FIG. 3 is a sectional view taken along the line III—III in FIG. 1.

DETAILED DESCRIPTION OF A PREFERRED EMBODIMENT

With reference to FIG. 1, reference numeral 1 denotes a powder coating booth in which powder coating (or painting of a powder coating material) is performed onto a vehicle body W which is an article to be painted. A conveyor 3 is disposed inside the powder coating booth 1 on a floor plate 2 which is made of a perforated plate (see FIGS. 2 and 3).

The vehicle body W is transported into the powder coating booth 1 by the conveyor 3. On an upstream side and on a downstream side of the powder coating booth 1, there are provided air sealing zones $4_1$, $4_2$ in order to prevent the powder coating material from leaking out of the powder coating booth 1.

The space inside the powder coating booth 1 between the air sealing zones $4_1$, $4_2$ is divided by air curtains 5a into three zones of a first manual coating zone $5_1$ on an upstream side, an intermediate automatic coating zone 6, and a second manual coating zone $5_2$ on a downstream side. In this manner, it is so arranged that the air inside each of the zones $5_1$, 6, $5_2$ does not flow into the adjacent zones $5_1$, 6, $5_2$. Among these zones, in the automatic coating zone 6, powder coating is performed from the sides of the vehicle body W by means of a plurality of first automatic coating machines 7a. Powder coating is also performed from an upper side onto the vehicle body W by means of a second automatic coating machine 7b which is disposed so as to bridge the conveyor 3. In each of the manual coating zones $5_1$, $5_2$, those portions of the vehicle body W which cannot be sufficiently coated by the automatic coating machines 7b are coated with a powder coating material by a worker by means of a portable type of coating gun (not illustrated).

As shown in FIG. 2, the automatic coating zone 6 is partitioned from an outward coating machine installation zone 9 by means of partition plates 8, 8 which are vertically disposed on both sides of the conveyor 3. Main bodies $7a_1$, $7b_1$, of each of the automatic coating machines 7a, 7b are disposed in the coating machine installation zone 9. Movable arms $7a_2$, $7b_2$ which are supported on the main bodies $7a_1$, $7b_1$ are projected (or extended) into the automatic coating zone 6 through slits (not illustrated) which are formed in each of the partition plates 8. The powder coating material is discharged from coating guns which are mounted on the movable arms $7a_2$, $7b_2$ to thereby coat the vehicle body W. By providing the partition plates 8 as disclosed hereinabove, the foreign matter from the automatic coating machines 7a, 7b can be prevented from entering the automatic coating zone 6 to the maximum extent possible (i.e., the entering of the foreign matter is kept to the minimum). Further, the partition plates 8 extend below the floor plate 2. The space under the floor of the automatic coating zone 6 is thus separated from the space under the floor of the coating machine installation zone 9.

The automatic coating zone 6 is supplied with air from the upstream side at a flow speed of about 0.3 m/sec. for example. That air inside the automatic coating zone 6 which is sent below the floor is discharged, as shown by an arrow A FIG. 2, out of the powder coating booth 1 via a first exhaust system 10 by suction with a blower (not illustrated). At the bottom of the space below the automatic coating zone 6, there is disposed a dry type of first recovering apparatus 11 which recovers the powder coating material. The air in the automatic coating zone 6 is filtered by this first recovering apparatus 11 before being discharged. The powder coating material that is separated and recovered through filtration from the air inside the automatic coating zone 6 is sent to a powder tank (not illustrated) via a powder coating material transporting system 11a for the purpose of reuse as a coating material for powder coating.

On the other hand, under the floor of the manual coating zones $5_1$, $5_2$, there is disposed, as shown in FIG. 3, a wet type of second recovering apparatus 12 which recovers the powder coating material that was used for powder coating inside the manual coating zones $5_1$, $5_2$ but has not been coated onto, or adhered to, the vehicle body W. The second recovering apparatus 12 is provided with a running water tray 12a which is disposed under the floor of the manual coating zones $5_1$, $5_2$ and which has formed therein a discharge port 12b. The running water tray 12a extends to a position under the floor of the coating machine installation zone 9. The running water tray 12a is supplied with running water 12c from a water supply port (not illustrated). The running water 12c is discharged from the discharge port 12b as shown by an arrow B into a separator tank (not illustrated).

The manual coating zones $5_1$, $5_2$ and the coating machine installation zone 9 are supplied with air, like in the automatic coating zone 6, from the upstream side at a flow speed of about 0.3 m/sec. for example. The air in each of the zones $5_1$, $5_2$, 9 is sent below the floor and is discharged from the discharge port 12b together with the running water 12c that flows along the running water tray 12a. Thereafter, as shown by an arrow C, the air is discharged out of the powder coating booth 1 via a second exhaust system 13. According to this arrangement, the powder coating material in the air inside each of the zones $5_1$, $5_2$, 9 can be effectively taken into (or trapped by) the running water 12c. Thereafter, the discharged water is filtered, or separated by centrifugal force, to thereby separate the powder coating material for recovery. The recovered powder coating material can be used for coating such portions as undercoats, or the like, in which external aesthetical quality is not always required. As explained hereinabove, the manual coating zones $5_1$, $5_2$ and the coating machine installation zone 9 are separated from each other by the air curtain 5a. Therefore, foreign matter from the main bodies $7a_1$, $7b_1$ of the automatic coating machines 7a, 7b will not flow into the manual coating zones $5_1$, $5_2$ and will consequently not adhere to the vehicle body W. Alternatively, the air exhausted by the two exhaust systems 10, 13 may be exhausted by a single exhaust system 14 as shown by chain lines in FIG. 1.

According to the above-described arrangement, the powder coating material in the automatic coating zone 6 into which no foreign matter gets mixed can be readily reused by recovering it by the dry type of first recovering apparatus 11 which is exclusively used for that purpose. Therefore, the ratio of reuse of the powder coating material is improved. Further, since the humidity inside the manual coating zones $5_1$, $5_2$ and the coating machine installation zone 9 becomes high by the running water 12c, the dropping (or precipitation) of the suspended matter such as the foreign matter, or the like, can be accelerated. Therefore, the suspended matter is prevented from adhering to the vehicle body W, which adhesion causes poor coating quality, or from entering into the automatic coating zone 6 through the slits of the partition plates 8.

If the second recovering apparatus 12 which recovers the powder coating material from the manual coating zones $5_1$, $5_2$ is arranged to be of a wet type, the air sealing zones $4_1$, $4_2$ which are provided on the upstream side and the downstream side in the above-described embodiment can be omitted. In addition, the wet type of recovering apparatus which recovers the powder coating material is simpler in construction and lower in cost than the dry type of apparatus. Therefore, it is advantageous with respect to maintenance and cost.

As explained hereinabove, according to the present invention, the powder coating material inside the automatic coating zone can be readily reused by recovering it with the dry type of first recovering apparatus which recovers the powder coating material. Therefore, the ratio of reuse of the powder coating material is improved.

It is readily apparent that the above-described powder coating booth meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for performing powder coating onto an article to be coated, comprising a powder coating booth divided into an automatic coating zone in which coating is performed only by an automatic coating machine and a manual coating zone in which coating is performed by a worker, said powder coating booth including:

a first recovering apparatus which recovers, in a dry state, only that powder coating material in said automatic coating zone which has not been coated onto the article to be coated; and a second recovering apparatus which uses water to recover, in a wet state, that powder coating material in said manual coating zone which has not been coated onto the article to be coated, said first recovering apparatus being provided separate from said second recovering apparatus, with recovered powder coating material from said automatic coating zone collected separately from recovered powder coating material from said manual coating zone.

2. A powder coating booth according to claim 1, wherein a single exhaust system is provided to exhaust air from both said first recovering apparatus and said second recovering apparatus.

* * * * *